United States Patent [19]
Quillen

[11] 3,902,825
[45] Sept. 2, 1975

[54] TEMPERATURE CONTROLLED AUTOMATIC WATER DISPENSER TO PROVIDE SUBSURFACE IRRIGATION FOR ORCHARD, FARM & VINEYARD PLANTS

[76] Inventor: John D. Quillen, 790 Woodland Ave., San Leandro, Calif. 94577

[22] Filed: Feb. 8, 1974

[21] Appl. No.: 440,843

[52] U.S. Cl. ................ 417/118; 61/13; 417/379
[51] Int. Cl. ...... F04f 1/06; F04b 17/00; E02b 13/00
[58] Field of Search .......... 412/118, 120, 126, 137, 412/138, 149, 207, 379; 61/13

[56] References Cited
UNITED STATES PATENTS

| | | | |
|---|---|---|---|
| 2,688,923 | 9/1954 | Bonaventura et al. | 417/379 |
| 3,309,012 | 3/1967 | Booth et al. | 417/379 |
| 3,819,301 | 6/1974 | Jaster et al. | 417/209 |
| 3,834,385 | 9/1974 | Jaster et al. | 417/209 |

*Primary Examiner*—William L. Freeh
*Assistant Examiner*—Richard E. Gluck
*Attorney, Agent, or Firm*—William R. Piper

[57] ABSTRACT

A temperature controlled automatic water dispenser for irrigating plant roots and the like in which an increase in ambient temperature will cause the device to dispense water automatically for irrigation use. The dispensed water is conveyed through appropriate water conveying lines to a plurality of seepage nozzles which are inserted into the soil adjacent to the plant roots. Thus, the irrigation water flows from the dispenser device directly to the roots of selected plants during intervals of rising temperature. When the ambient temperature stabilizes, or whenever the temperature is falling, the device will not dispense water.

5 Claims, 7 Drawing Figures

TEMPERATURE CONTROLLED AUTOMATIC WATER DISPENSER TO PROVIDE SUBSURFACE IRRIGATION FOR ORCHARD, FARM & VINEYARD PLANTS

BACKGROUND OF THE INVENTION

Field of the Invention

This invention relates to water dispensers for farm and garden irrigation systems and more particularly to a new type of water dispenser system which controls the quantity, flow and distribution of water automatically by virtue of atmospheric temperature changes. The greater the ambient temperature variations between day and night, or during any given time period, the larger the volume of water the system will dispense.

The water is dispensed during intervals of rising temperature. Whenever the ambient temperature is momentarily stabilized, or whenever the temperature is falling, no water is dispensed by the system. In practice, the normal day-to-night temperature variations provide the desirable temperature parameters for continuous operation of my water dispenser system.

In operation, my water dispenser system distributes water directly to the root area of the plant entities to be irrigated. This method is hereinafter referred to as proximity irrigation, and the principle is especially adaptable to hilled and/or clustered types of plant cultivation. This category includes most vegetables, sweet corn, berries, fruit trees, decorative plants, etc.

Conventional irrigation methods are of two general types. The first involves a system of flooding the land surface by opening water gates or by equivalent means. The second method involves the much used sprinkling procedures wherein water is conveyed through pipes and spray nozzles. Hence, conventional irrigation methods are dependent upon the availability of copious water resources on the one hand and upon compatable land topography on the other. The absence of one or both of these amenities negates the agriculturial potentials of vast land areas all over the world.

Accordingly, it is one of the primary objects of the present invention to provide a new principle of irrigation which is adaptable to geographical areas of deficient water resources and to land areas rendered agriculturally marginal purely because of topographical factors; i.e., hilly or mountainous conditions.

A second object of the present invention is to provide a new principle of irrigation which scrupulously conserves water and scientifically dispenses it according to precise needs of the crop or orchard entity which receives it.

It is still another object of the present invention to provide a water dispensing means which, in effect, operates continuously thereby supplying the root structure of plants just the amount of moisture required for healthy growth.

Yet another object of the present invention is to provide a fully automatic water dispenser which is self-tending and which is capable of increasing the amount of water dispensed to compensate for continuous plant growth, it being understood that young seedlings require less water than is subsequently required as the specimen develops.

In operation my irrigation dispenser system supplies water directly to the root structure of individual plants by use of suitable pipe lines and seepage nozzles. Hence, proximity irrigation is functional on any land terrain, and, since only the immediate root area of plants receive water, the amount required for efficient irrigation is only a very small fraction of that used in conventional irrigation methods.

Proximity irrigation further reduces loss by discharging water below the surface of the soil. This prevents rapid evaporation and also undesirable crusting of the soil and it minimizes weed growth, all of which are undesirable side effects of conventional methods of irrigation.

Because proximity irrigation makes possible phenomenal conservation of water, it becomes a feasible objective to supply such a system by water containing tank trucks, etc., when and where native water resources are inadequate or nonexistent.

Other objects and advantages of my invention will become apparent as the following description proceeds, taken in conjunction with the drawings provided.

DESCRIPTION OF THE PREFERRED EMBODIMENT

Figure 1:
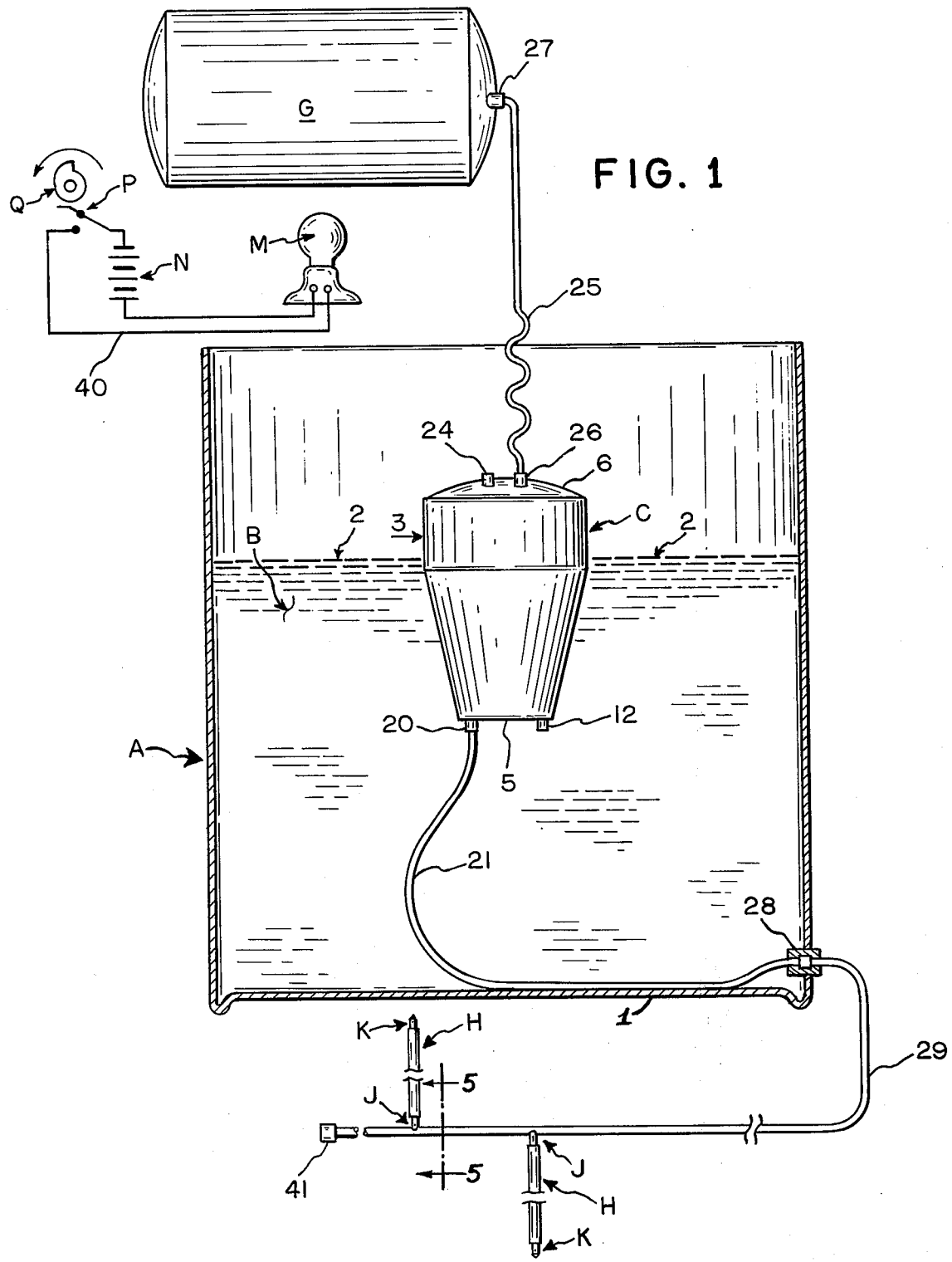
FIG. 1 is a schematic showing of my entire irrigation system.

In carrying out my invention, I provide a water storage reservoir indicated generally at A in FIG. 1. It is possible for my invention to make use of a natural water supply, such as an elevated pond or lake, but I have indicated the reservoir A with side walls and a bottom 1 for holding water B that is to be used for irrigation purposes. The reservoir has an open top so that atmospheric pressure can bear upon the surface 2 of the volume of water B in the reservoir.

Figure 2:
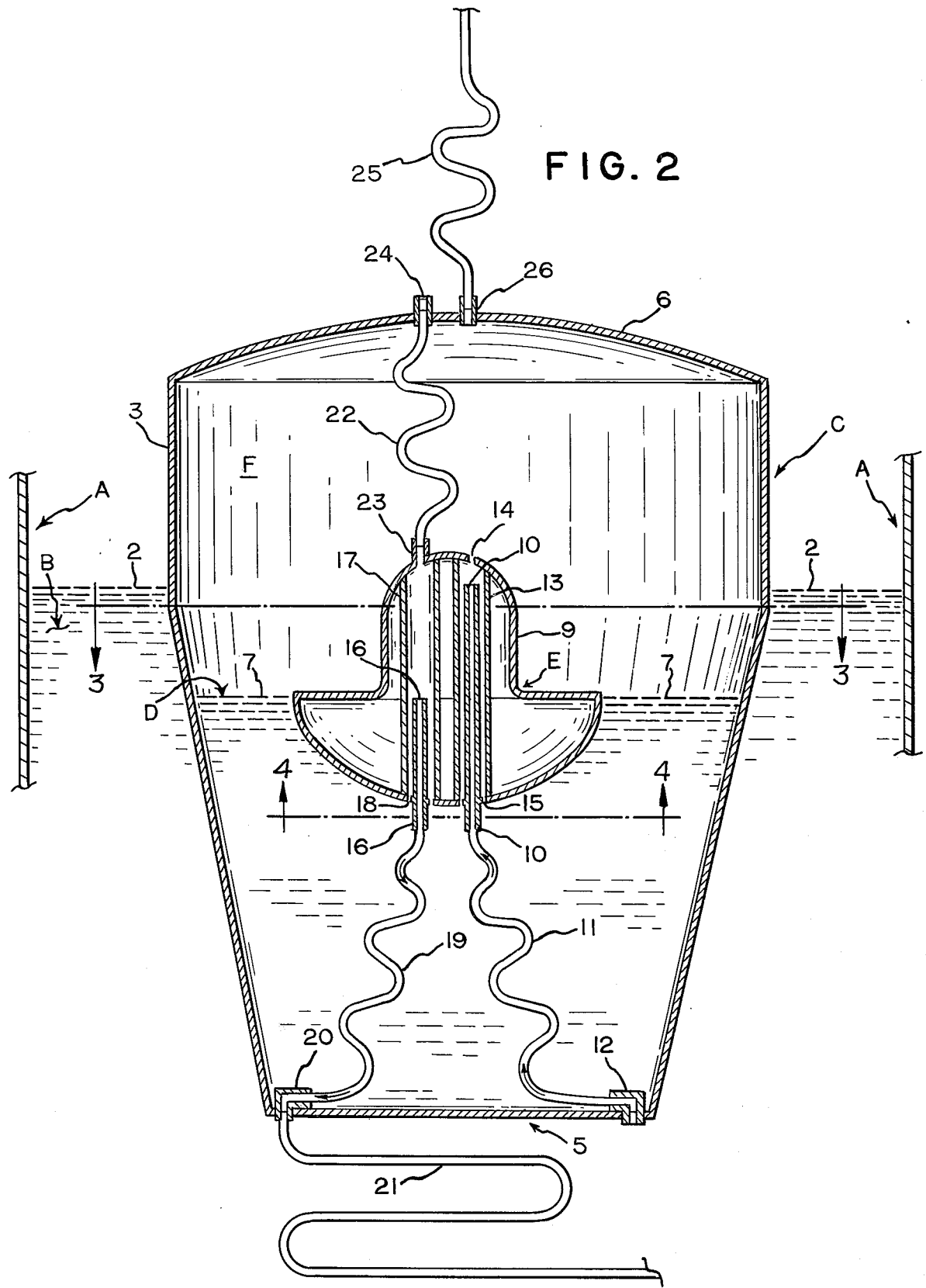
FIG. 2 is an enlarged vertical section through a buoyant air-tight envelope shown in elevation in FIG. 1, this envelope containing water on which a pumping unit floats, the unit also being shown in section.

Within the reservoir A, I place a buoyant envelope C that is shown in side elevation in FIG. 1 and also is shown in an enlarged vertical section in FIG. 2 in the reservoir A. This envelope will function very much the same as a lung does in the human body. The further detailed description of my novel system will clarify the assumption that the envelope C functions as a lung in that air alternately flows into and then out of the envelope C. Both FIGS. 1 and 2 illustrate the buoyant envelope C as floating on the water B in the reservoir A, and as being partially submerged in the water. The envelope has a side wall whose upper portion 3 is cylindrical and its lower portion is truncated in shape. The envelope has a bottom wall 5 and a partially dome-shaped top 6.

The envelope C has its truncated portion partially filled with water, indicated at D, and the surface of the water is shown at 7, see FIG. 2. I mount a buoyant water pumping unit E in the envelope C and this unit will float on the water D in the envelope and be partially submerged in the water. I will explain how the pumping unit will draw water in from the body of water B in the reservoir A and deliver this water into the interior of envelope C so as to maintain the body of water D in the envelope. I further will explain how the pumping unit E will function in much the same manner as the heart in the human body in that the pumping unit will also draw water from the body of water D in the envelope C and deliver this water into an irrigation line that will convey the water to the roots of selected plants.

Figure 3:
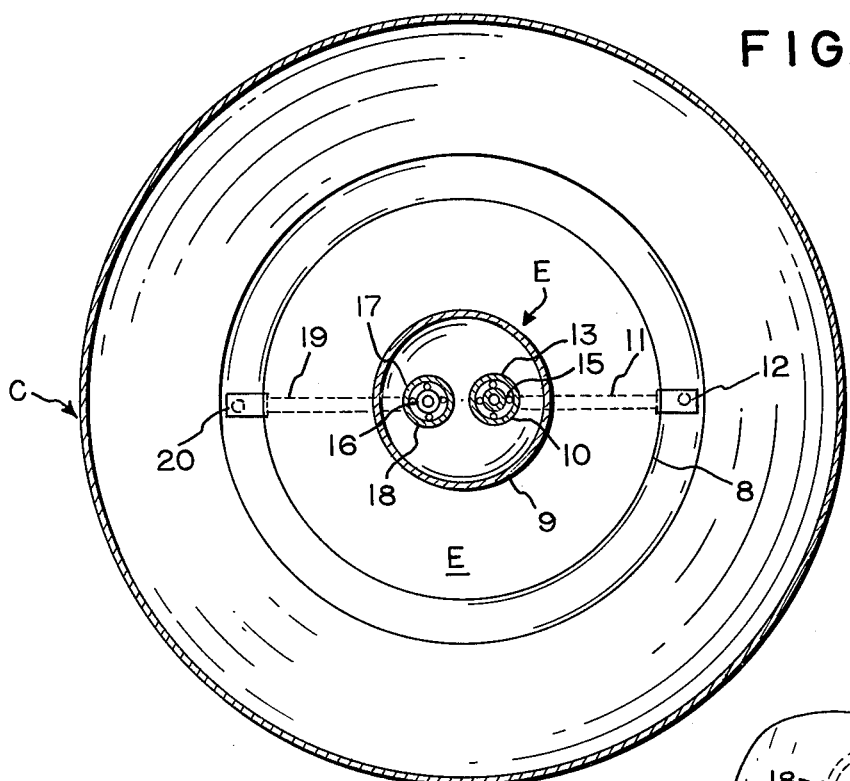
FIG. 3 is a horizontal section taken along the line 3—3 of FIG. 2.

In FIGS. 2 and 3, I show the water pumping unit E as having a bulbous lower portion 8 and a cylindrical upper portion 9 with a dome at its top. A water inlet pipe 10 extends upwardly from the bulbous bottom 8 of the water pumping unit E and the upper end of the pipe is spaced below the dome top 9 of the unit. The lower end of the water inlet pipe 10 extends below the bulbous bottom of the unit E and it is connected to a flexible tube 11 that in turn communicates with an elbow 12, or other type of fitting that extends through the bottom wall 5 of the envelope C and communicates with the body of water B in the reservoir A. The purpose of the flexible tube 11 is to permit the water pumping unit E to rise and fall in the envelope C as the water level 7 of the body of water D changes as will be more fully explained hereinafter.

Figure 4:
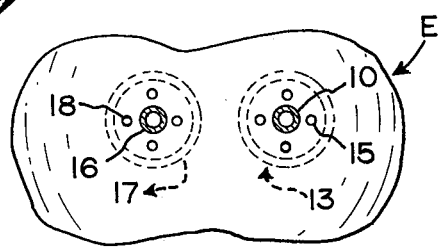
FIG. 4 is a further enlarged view of a portion of the bottom of the water pumping unit and is taken along the line 4—4 of FIG. 2.

The water inlet pipe 10 is enclosed in a concentrically mounted pipe 13 that extends from the bottom 8 to the top 9 of water pumping unit E, see FIGS. 2 and 3. The dome of the pumping unit E has a breather hole 14 that communicates with the top of the pipe 10 and is enclosed by the top of the pipe 13. The bottom of the unit E has openings 15 that communicate with the interior of the pipe 13, see also FIG. 4. It will be seen from the structure thus far described for the water pumping unit E that water can flow from the body of water B in the reservoir A into and through the fitting 12, thence through the flexible tubing 11 and into the pipe 10. From the top end of the pipe 10, the water can flow into the outer pipe 13 and then travel downwardly on the interior of the pipe 13 and out through openings 15 and into the body of water D in the envelope C. How this is accomplished will be explained when describing the operation of the system.

The water pumping unit E, see FIG. 2, also has a water outlet pipe 16 that projects through the bottom 8 of the unit and the top end of the pipe 16 is disposed a slight distance above the water level 7 of the body of water D in the envelope C. An outer pipe 17 encloses the pipe 16 and extends from the dome 9 to the bottom 8 of the water pumping unit E. A plurality of openings 18 in the bottom 8 surrounds the pipe 16 and permits water from the body of water D in the envelope C to enter the pipe 17 through openings 18. This water can flow up inside of the pipe 17 and then enter the water outlet pipe 16. A flexible tubing 19 is connected to the lower end of the pipe 16 and the other end of the tubing is connected to an elbow fitting 20 that extends through the bottom 5 of the envelope C and has another flexible tubing 21 connected to the fitting. Before describing how the flexible water conveying tubing 21 communicates with the external water irrigation system, it is best to state that the outer pipe 17 communicates with the atmosphere through a flexible tube 22 that has one end communicating with the pipe 17 through a nipple 23 in the dome 9 of the unit E and has its other end connected to a fitting 24 that extends through the dome 6 of the envelope C and vents to the atmosphere.

It will further be seen from FIGS. 1 and 2 that the air chamber F in the upper portion of the hermetically sealed envelope C is in communication with a hermetically sealed air temperature sensor container G through a flexible tubing 25 that has one end connected to a nipple 26 that extends through the dome 6 of the envelope C, and has its other end connected to another nipple 27 that communicates with the interior of the air temperature sensor container G. Since the container G is hermetically sealed, the air pressure therein is subject to vary in direct proportion to the change in temperature of the ambient air surrounding the container. If the ambient air temperature increases, the air volume in the container G will seek to expand thereby causing the internal air pressure to increase and a flow of air from the container G through flexible tubing 25 into the air chamber F in the top of the envelope C will take place. The increase in air volume in the air chamber F also increases the air pressure in the chamber F. This increase in air pressure will act upon the body of water D to depress the liquid level 7 of the body of water. The purpose of this will be explained in the operation of the system. The opposite results obtain if the ambient temperature surrounding container G decreases. Then the drop in temperature within the container G will lessen the internal air pressure and a counter flow of air from the chamber F in the envelope C back through the flexible tubing 25 and into the container G will result. This will reduce the air pressure in the air chamber F and permit the water level 7 of the body of water D to rise the atmospheric air pressure on the surface 2 of the body of water B in the water storage reservoir A will be greater than that on the water surface 7 on the body of water D in the envelope C, and water will therefore enter the envelope C through the nipple 12 in the bottom 5 of the envelope, thence flow through the flexible tube 11, thence through the pipe 10 in the water pumping unit E, thence overflowing from the pipe 10 into the pipe 13, and, finally, out through the openings 15 in the bottom of the unit E and into the water body D in the envelope C.

Figure 5:
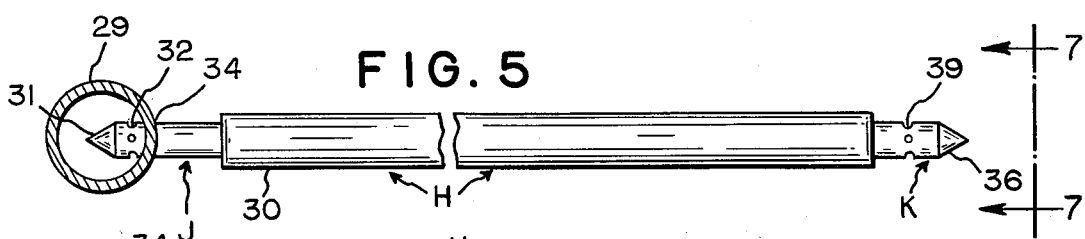
FIG. 5 is an enlarged transverse section through the water discharge line and is taken along the line 5—5 of FIG. 1. The water discharge line is pierced by an anchor nipple that receives water from the discharge line and delivers it to the plant roots that are to be irrigated.
Figure 6:
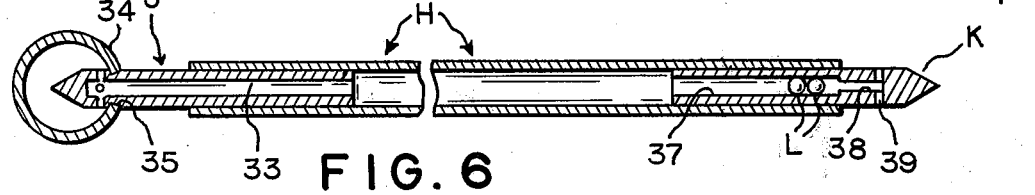
FIG. 6 is a longitudinal section through the water seepage nozzle assembly shown in FIG. 5.
Figure 7:
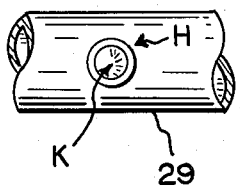
FIG. 7 is an end view of FIG. 5 when looking in the direction of the arrows 7—7 in FIG. 5.

Before describing the operation any further, it is best to refer to FIGS. 1, 5, 6 and 7, where the irrigation lines are shown that are used for delivering water to the plant roots, the plant roots not being shown. The flexible tubing 21, see FIG. 1, leads from the fitting 20 to a sleeve 28 that projects through the wall of the water storage reservoir A, see FIG. 1. A water discharge line 29 connects the sleeve 28 and may be of any desired length. A plurality of water seepage nozzle assemblies, indicated generally at H, are shown in FIGS. 5 and 6.

The water seepage nozzle assemblage H, shown in FIGS. 5 and 6, has an outer tubular housing 30 which is preferably made of flexible plastic and may be of any desired length. At one end of the housing 30, I mount an anchor nipple J. This nipple has a tubular body that can be inserted into the end of the tubular housingg 30 to make a water-tight seal therewith. The nipple J also has a conical-shaped head 31 that is used for piercing the water discharge line 29 at any desired point. It is obvious that the discharge line 29 could have prepunched openings for receiving the conical-shaped head 31. The head 31 has a plurality of radially extending passages 32 for conveying water from the water discharge line 29 into the axial passageway 33 in the cylindrical body of the anchor nipple J, see FIG. 6. Also, the cylindrical body J of the anchor nipple has an annular groove 34 that receives the edge of the opening 35 in the water discharge line 29 for making the anchor nipple J secure to the discharge line 29.

At the other end of the tubular housing 30 of the seepage nozzle assembly H, I mount a water seepage nozzle, indicated generally at K in FIGS. 5 and 6. The nozzle K is tubular and is slidably received in the tubular housing 30. The outer end 36 of the nozzle K is preferably made conical-shaped so that the nozzle may be inserted into the ground and adjacent to the plant roots, not shown, that are to be irrigated. The nozzle K has an axial passage 37 of a predetermined diameter and the portion 38 of the passage 37 has a reduced diameter that communicates with radial passages 39 that extend to the outer circumference of the nozzle. The enlarged passage 37 can receive one or more fibrous pellets L. The pellets L will function as water flow retardents. The number of such pellets used in a single seepage nozzle will determine the flow rate of the nozzle.

OPERATION

From the foregoing description of the various parts of the device, the operation thereof may be readily understood. Attention is directed to the fact that the water level 2 of the body of water B in the water storage reservoir A is at a higher level than the water level 7 of the body of water D in the envelope C. This differential in water height between the surface level 2 and the surface level 7 remains the same irrespective of the amount of water in either body of water B or D. From this it follows that even though the amount of water in the body of water D in the envelope C is a variable quantity, the water pumping unit E nevertheless maintains a fixed position with respect to the water level 2 in the water storage reservoir A. This fixed relationship between the water pumping unit E and the water level 2 in the body of water B permits the top end of the water inlet pipe 10 to maintain the correct height above the surface level 2 of the body of water B to prevent simple gravitational flow of water from the water storage reservoir A into the envelope C. Hence, the only time water flows from the water storage reservoir A into the envelope C is in response to a condition of reduced air pressure in the air chamber F in the envelope C, or in response to an internal air pressure in the chamber F which pressure is less than one atmosphere.

In order for the height between the two water surface levels 2 and 7, see FIG. 2, to remain constant while the volume of water in the body of water D in the envelope C varies, it is necessary that the envelope C sink or rise with regard to a mean submersion depth in relation to the amount of water flowing in or out of the envelope C. Therefore, as water flows into the body of water D in the envelope C through the flexible tube 11, pipes 10 and 13 and the openings 15 in the pumping unit E, the envelope C submerges at a commensurate rate in the body of water B in the water storage reservoir A. Conversely, as water flows out of the body of water D in the envelope C through openings 18 in the pumping unit E, the pipes 17 and 16 and the flexible tube 19, the envelope C rises in the body of water B at a commensurate rate.

As already stated, the air in the sealed sensor container G, see FIG. 1, is subject to internal pressure variation as the ambient temperature surrounding the container varies. In the operation of my system, any expansion or contraction of air within sensor chamber G due to ambient temperature variations will cause a similar expansion or contraction within the air chamber F in the envelope C, see FIG. 2. Each full cycle of air pressure variation will create a pulse stimulus similar to a heart beat within the envelope C. Thus, the envelope C and unit E will produce a water pumping action alternately drawing water into the envelope C from the water body B through the tube 11, pipes 10 and 13 and the openings 15 in the pumping unit E as the air pressure in the air chamber F decreases and remains below one atmosphere, and then expelling the water from the envelope C through the openings 18 and pipes 17 and 16 in the pumping unit E and, thence, through the tube 19 as the air pressure in the chamber F increases and remains above one atmosphere. At no time does any outside air enter the container G or the envelope C. Rather, it is the increasing or decreasing in the amount of water in the envelope C which ultimately restores air pressure equilibrium between the outside air and the air in the closed air circuit formed by the container G, the tube 25 and the air chamber F in the envelope C. It should be kept in mind that the water pumping unit E maintains a fixed position relative to the surface level 2 of the body of water B in the water storage reservoir A. As the volume of water in the envelope C varies, the envelope will rise and fall in the body of water B at a commensurate rate so that the difference in height between the water levels 2 and 7 will remain constant and the flexible tubes 11, 19, and 22 will permit the unit E to float freely on the water D during the movement of the envelope C.

During the time that the water enters the envelope C from the body of water B, no water can escape from the envelope for the following reasons: First, the negative air pressure, which is any pressure less than one atmosphere, in the air chamber F, which is inside of the envelope C, compared to a full atmospheric air pressure, see FIG. 2, which is vented through the flexible tube 22 and into the pipe 17 which is mounted in the water pumping unit E and will force down the water in the pipe 17 to make it impossible for the water in the pipe 17 to overflow into the pipe 16; and, second, since the water pumping unit E maintains a fixed floating height in the envelope C and since the top of the pipe 16 is positioned at a predetermined height above the surface level 7 of the body of water D in the envelope C, it follows that water cannot overflow into the pipe 16 under conditions of either internal negative air pressure or whenever the internal and external air pressures are equal, both being at one atmosphere.

Under condition of rising ambient air temperature, the air inside of both air chamber F in the envelope C and inside of the container G seeks to expand, thereby developing a positive internal air pressure, a pressure greater than one atmosphere, in the air chamber F, which pressure is greater than the atmospheric pressure upon the surface 2 of the body of water B in the storage reservoir A. This greater internal air pressure in the air chamber F causes air to flow through the breather hole 14 in the water pumping unit E and the higher pressure of air in the pipe 13 and in the top of the pipe 10 will force the water level in the pipe 10 down, making it impossible for water to flow from the water storage reservoir B into the envelope C through the tube 11, pipes 10 and 13 and openings 15. The higher air pressure in the air chamber F will bear on the surface 7 of the water D in the envelope C and will overcome the atmospheric air pressure from the tube 22 and the pipe 17 with the result that water will flow from the body of water D through the openings 18 in the unit E and thence through the pipes 17 and 16 and out through the tube 19 to the tube 21 and the water discharge line 29, see FIGS. 1 and 2. The water continues to flow under gravitational force until it discharges through the seepage nozzles K at the plant roots, not shown. The terminal end of the water discharge line 29 is closed by the cap 41.

The operation of my water dispenser system, thus far described, resulted from ambient air temperature variations caused by solar heat alone. It is also possible to artificially program the subject water dispenser by applying an extraneous source of heat to the air temperature sensor container G. In FIG. 1, I show diagrammatically one example of accomplishing such an optional method of operation. The diagram shows a light bulb M which is symbolic of any electrical heating device. The light bulb M is positioned adjacent to the container G and a simple electric circuit 40 connects the bulb M to an electrical power source N and to the electric switch P. The switch P can be manually closed and opened at appropriate time intervals, or a cam Q may be motorized and actuated by a timing mechanism, not shown, thus causing the switch P to close and open according to any chosen schedule. By closing the switch P, the bulb M is energized and the heat from the bulb M warms the container G, which in turn heats the air on the inside of the container G, thereby causing a rise in the internal air pressure. When the switch P is opened, the container G cools and the internal air pressure in the container G decreases. By alternately increasing and decreasing the air pressure in the container G by intermittently applying extraneous heat, water is dispensed through the seepage nozzles K in the same manner as if the variation of heat about the container G were due to solar temperature variations.

I claim:

1. A temperature controlled automatic irrigation mechanism:
   a. a first body of water under atmospheric pressure;
   b. a sealed envelope buoyantly supported by said body of water and having an air chamber in its top and a second body of water in its lower portion;
   c. a buoyant water pumping unit floatable in the second body of water;
   d. a first means for conveying water from said first body of water under atmospheric pressure into said pumping unit and thence into the second body of water within said envelope when the atmospheric air pressure exceeds the air pressure within said air chamber;
   e. a sealed temperature sensor container having a tubular communication with said air chamber within said envelope so that a lowering of the ambient temperature of the air surrounding said temperature sensor container will cool the air therein causing a lowering of the air pressure in the temperature sensor container and also within said air chamber in said envelope to below that of the atmospheric pressure whereby water will flow from said first body of water through said first water conveying means into said pumping unit and thence into said second body of water within said envelope;
   f. a second means for feeding water from said second body of water into said pumping unit and thence to an irrigation system, said second water feeding means including means for exposing the water therein to atmospheric pressure;
   g. whereby an increase in the ambient temperature surrounding said temperature sensor container will increase the temperature and, therefore, the air pressure within said container and within said air chamber in said envelope to a pressure higher than atmospheric pressure, thus causing this higher pressure on the second body of water in the envelope to overcome the atmospheric pressure acting on the water in the second water feeding means and causing water to flow from the second body of water through said second means into said pumping unit and thence from the pumping unit to an irrigation system for watering purposes, said irrigation system is below said pumping unit, and flow therebetween is caused by gravity.

2. The combination as set forth in claim 1: and in which
   a. said first means for conveying water from said first body of water into said second body of water within said envelope includes;
   b. a first flexible conduit in said envelope and having an inlet communicating with said first body of water and having an outlet connected to a first pipe mounted in said pumping unit;
   c. said first water conveying means also having a second pipe in said pumping unit and surrounding said first pipe, the top of said first pipe terminating at a point below the top of said second pipe; and
   d. said pumping unit having a first group of openings in the lower portion placing the interior of the second pipe in communication with the second body of water in said envelope.

3. The combination as set forth in claim 1: and in which
   a. said second means for feeding water from said second body of water into said pumping unit and thence to an irrigation system includes;
   b. a third pipe in said pumping unit extending from the top to the bottom of said unit;
   c. a second flexible conduit having one end communicating with the top of the third pipe and having its other end projecting through said envelope and communicating with the atmosphere;
   d. a fourth pipe comprising a water outlet pipe carried by said pumping unit and having its lower end connected to a third flexible conduit whose other end extends through the bottom of said envelope and is connected to a fourth conduit that extends beyond the first body of water and communicates with the irrigation system;
   e. the bottom of said pumping unit having a second group of openings placing the second body of water in said envelope in communication with the interior of said third pipe so that any water entering the third pipe through said second group of openings can flow into said fourth pipe and into said irrigation system.

4. The combination as set forth in claim 1: and in which
   a. said first means for conveying water from said first body of water into said second body of water within said envelope includes;
   b. a first flexible conduit in said envelope and having an inlet communicating with said first body of water and having an outlet connected to a first pipe mounted in said pumping unit;
   c. said first water conveying means also having a second pipe in said pumping unit and surrounding said first pipe, the top of said first pipe terminating at a point below the top of said second pipe; and
   d. said pumping unit having a first group of openings in the lower portion placing the interior of the second pipe in communication with the second body of water in said envelope;
   e. said second means for feeding water from said second body of water into said pumping unit and thence to an irrigation system includes:
   f. a third pipe in said pumping unit extending from the top to the bottom of said unit;
   g. a second flexible conduit having one end communicating with the top of the third pipe and having its other end projecting through said envelope and communicating with the atmosphere;
   h. a fourth pipe comprising a water outlet pipe carried by said pumping unit and having its lower end connected to a third flexible conduit whose other end extends through the bottom of said envelope and is connected to a fourth conduit that extends beyond the first body of water and communicates with the irrigation system;
   i. the bottom of said pumping unit having a second group of openings placing the second body of water in said envelope in communication with the interior of said third pipe so that any water entering the third pipe through said group of openings can flow into said fourth pipe and into said irrigation system.

5. The combination as set forth in claim 1: and in which
   a. means for applying a source of external heat to said temperature sensor container for extraneously increasing the internal temperature thereby increasing the air pressure therein which increased air pressure is communicated to said buoyantly supported sealed envelope and causing a flow of water from the second water body in said envelope through said second water feeding means into said pumping unit and thence to said irrigation system for discharging through seepage nozzles into the soil;
   b. the termination of each extraneous application of external heat causing the temperature within said temperature sensor container to decrease thereby resulting in a reduced air pressure in said container which lower air pressure is communicated to the buoyantly supported sealed envelope to lower the pressure therein, thereby causing said first water conveying means to transfer water from said first body of water into said second body of water in said envelope to replenish the amount discharged into the irrigation system during the application of the extraneous heat.

\* \* \* \* \*